Aug. 22, 1967 D. P. LE HOY 3,337,059

DISC HOLDER

Filed Oct. 13, 1965

2 Sheets-Sheet 1

INVENTOR.
DAVID P. LEHOY

BY Richard D. Law

ATTORNEY

INVENTOR.
DAVID P. LEHOY
BY
Richard D. Law
ATTORNEY

United States Patent Office 3,337,059
Patented Aug. 22, 1967

3,337,059

DISC HOLDER

David P. Le Hoy, 1258 Krameria, Denver, Colo. 80220

Filed Oct. 13, 1965, Ser. No. 495,455
7 Claims. (Cl. 211—86)

ABSTRACT OF THE DISCLOSURE

A disc holder includes a series of peripheral frames pivotally mounted on a central holder; adjacent horizontal members having upper and lower opposed grooves. The lower groove of each has a resilient, deformable foam plastic strip mounted therein. The adjacent horizontal members are closer together than the diameter of the disc or the width of a phonograph album so that when placed in the lower groove pressing on the disc depresses the plastic and the top of the disc may be placed in the upper groove. On release of pressure the plastic resumes its natural shape and the disc is releasably held in vertical position in the upper and lower grooves.

This invention relates to phonograph disc or album holders and more particularly to vertically mounted leaves arranged to hold plural albums and arranged to be pivotally mounted with other such leaves on a single upright member.

Included among the objects and advantages of the present invention is a phonograph record or album holder in which the phonograph records or albums are held in full face view for easy and fast selection of the desired selection, and it, also, provides for a fast and easy method of inserting or removing such phonograph records or albums. The device may include a series of leaves pivoted about a single upright member so that the leaves may be turned to view records mounted on both sides thereof. The invention provides a device which folds into a compact form utilizing very little space.

Another object of the invention is to provide a record holding device which has an opening less than the width of the record and is provided with a resilient member in a groove which may be depressed for inserting or removing the record from the frame.

These and other objects and advantages of the invention may be readily ascertained by referring to the following description and appended illustration in which.

Figures 1, 2, 3:
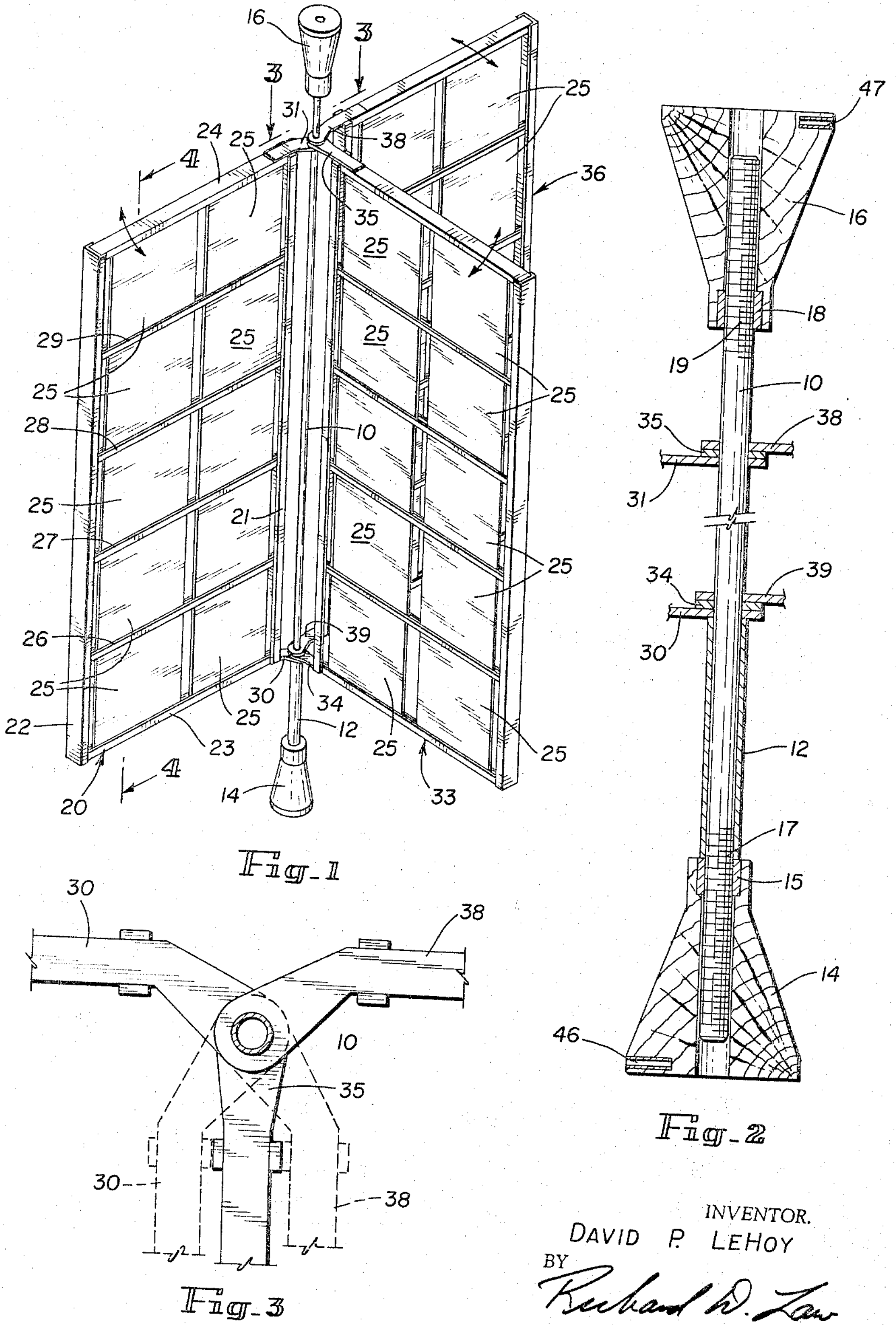
FIG. 1 is a perspective view of one form of a record holder according to the invention utilizing a floor-to-ceiling mount.
FIG. 2 is an enlarged detail, in partial cross-section, of a holding pole for the record support according to the invention.
FIG. 3 is an enlarged detail of the pivot member for the leaves of the phonograph record holder according to the invention.

In the device illustrated in FIG. 1 a center pole 10 is provided with a sleeve 12 for supporting a plurality of individual record holding leaves thereon. The bottom of the center pole is provided with a base 14 and the upper end is provided with a top cap 16 which is substantially identical to the base. As shown in FIG. 2 the base 14 is provided with an insert 15 which is threadedly engaged with the threads 17 on the pole providing a height adjustment so that the base and the cap may be pushed tightly between the floor and the ceiling. On the opposite end, the cap 16 is provided with an insert 18 for threadedly engaging threads 19 on the center pole 10. In this manner, the center pole may be snugly secured between the floor and the ceiling. The caps may be made of wood, plastic, or the like for decoration and the inserts provide stability for the parts. Where desired inserts 46 and 47 may be mounted in the base and cap, respectively, for the insertion of a cheater or bar for turning them for adjustment.

The rack shown in FIG. 1 includes three leaves, each of which is pivotally mounted on the center shaft and each provided with a plurality of horizontal guides which are spaced apart a distance to support a phonograph record therebetween. Leaf 20 includes an inner vertical rail 21, an outer vertical rail 22, a lower horizontal rail 23 and upper horizontal rail 24 collectively forming the exterior frame for the leaf of the phonograph record rack. Record albums 25 are supported between a series of grooved rails 26, 27, 28 and 29 in vertical or full face view. The rack is arranged to hold either the records or the records in their jackets, commonly called an album. The plurality of horizontal channels 26 through 29 and the upper and lower rails provide groove means for supporting records therebetween, the construction of which is detailed below. The frame 20 is mounted on hinge leaves 30 and 31, each of which is pivotally mounted on the center pole 10. In a similar manner, a record holding leaf 33 is mounted on hinge leaves 34 and 35 while the record leaf 36 is mounted on hinge sheaths 39 and 38. These hinge sheaths are pivoted on the pole and stack, as shown in FIG. 2, to provide pivotal movement for record leaves.

Since the construction of the record or album holding leaves 33 and 36 are essentially the same as the leaf 20, detailed description of the one leaf will provide a description of the remaining leaves. It is, also, to be noted that a plurality of the leaves may be mounted on a single upright, the number being primarily the desires of the owner.

Figures 4, 5, 6, 7, 8:
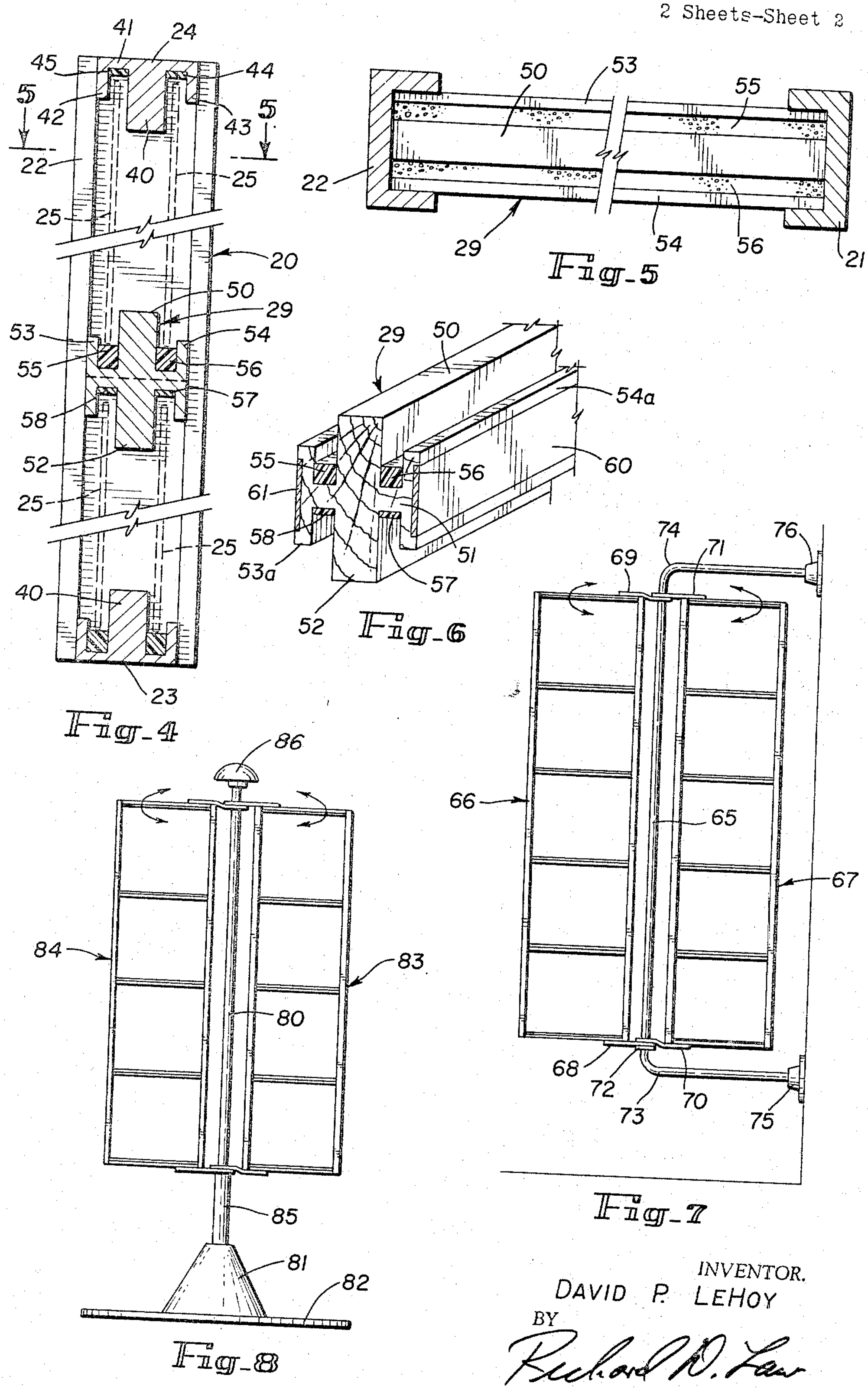
FIG. 4 is a cross-sectional view of a leaf of the record holding members of the support according to the invention.
FIG. 5 is a cross-sectional view of a leaf for supporting the phonograph records taken along section lines 5—5 of FIG. 4.
FIG. 6 is a perspective, in enlarged detail, showing a modified form of horizontal channel including the resilient members mounted in the record holding grooves.
FIG. 7 is a schematic view showing a wall supported mount for the display of a plurality of phonograph record holding leaves.
FIG. 8 is a schematic view of a floor supported phonograph record holder.

The construction of the horizontal rails is illustrated in FIGS. 4–6. The upper and lower rails include a center section 40 forming a T, and a top 41 and lateral depending flanges 42 and 43 from the top which are substantially parallel to the center 40. Thin strips 44 and 45, of foamed plastic, such as Styrofoam, Dyrofoam, etc., are respectively mounted in each of the grooves between the flanges 43 and 42 and the center. The bottom rail or channel 23 is of similar construction and it need merely be reversed in position to form the bottom. In place of the thin foamed plastic, however, the thicker strips should be used, as explained below. The center rails may two top or bottom rails secured together back to back. The rails may, also, be made as a unit. In this instance, the channel includes an upper center member 50, a lateral member 51 and a lower center member 52 generally in the form of a cross. A side flange 53 extends above and below the lateral 51 and an opposite side flange 54 extends above and below the lateral 51, and both flanges approximately parallel the two center members. A strip of resilient material 55 (thicker than strips 44 and 45) is mounted in the left groove and a similar strip 56 is mounted in the opposite groove. In one form the lower strips are about ½-inch thick and the upper strips are on the order of ⅛ to ¼ of an inch. This resilient material should be compressible, particularly the lower strips, a sufficient amount to permit the entry of a phonograph record into the grooves. On the lower side of the grooves are thinner strips of resilient material 57 and 58 to protect the tops of the albums. The distance between the horizontal members plus the plastic should be wide enough so that an album fits and the space between the edges of the flanges is narrower than the album so that an album will be retained by the flanges. The resilient material in the lower groove may be compressed to permit entry or withdrawal of the phonograph album or record. This is accomplished with the record resting in the lower groove by pushing down on the record to depress the resilient material and to move the top of the record into or out of the top groove in the upper channel. For entry, on releasing the phonograph record the resilient material moves the record up so that its top is held behind the flange. Each of the upper grooves is provided with a thin piece of resilient material to prevent damage to the top of the phonograph record; however, it is not an essential part of the rack.

In the modification shown in FIG. 6, a modified center horizontal member is essentially identical to the ones of FIG. 4, including the upper and lower center members; however, the flange members 54*a* and 54*c* are provided with metal strips or other kinds of inserts 60 and 61 which may be used for decoration, strength or the like. The rail functions in a manner similar to the other rails since it is provided with strips of resilient material 55 and 56 which may be depressed for the entrance or withdrawal of a phonograph record.

The wall mount shown in FIG. 7 includes a center pole 65 and a series of leaves 66 and 67, which are preferably only one record wide, and each record holding leaf is mounted on hinge sheaths, for example, record leaf 66 is mounted on hinge leaves 68 and 69 which in turn are pivotally mounted on the center pole 66. The record leaf 67 is mounted on hinge sheaths 70 and 71 which in turn are mounted on the center pole above the other hinges. A stop 72 is mounted on the lower end of the center pole to support the hinge parts in proper position. The center pole is bent at 90° at 73 and 74. The lower end of the pole is secured to a lower wall mount 75, and the upper end is secured to an upper wall mount 76 which provides for a semipermanent installation and permits the record leaves to be rotated completely around. In this manner, a considerable number of leaves may be provided on the central pole for the storage of a large number of record albums.

In the model illustrated in FIG. 8, a center pole 80 is mounted on a base 81 which may be provided with a stabilizing plate 82. The record leaves 83 and 84 are mounted on hinges rotatably mounted on the center pole in a manner described for the other modifications. A sleeve 85 provides a positioning means for the leaves on the center pole 80. A cap 86, which provides decoration and may be used to house an electric light for illumination, is mounted on the center pole to complete the structure.

In any of the modifications the leaves utilize the channels with the resilient material for the movement of the phonograph record into or out of the space. The arrangement provides for the placement of phonograph records in their jackets in the rack as well as single phonograph records not in jackets. It is, of course, preferable to maintain the phonograph records in their jackets to keep them clean. Other types of resilient material may be used in the grooves to provide for the depression thereof for the moventment of a phonograph record. For example, a bowed flat spring may be used to provide resiliency for the phonograph record insertion and withdrawal from the grooves. The spring may be depressed so that the top of the record may be moved into or out of the groove in the upper channel. Foamed rubber and other types of foamed plastics and elastomers may be utilized.

The channels may be made of any suitable material such as wood, aluminum, plastic or the like while the center pole is preferably made of metal for strength. The bases may be made ornamental to conform with the decor of the locale of the rack. Obviously the channels may be placed any desired distance apart to conform with the type and the size of record to be placed therebetween. The floor to ceiling held device as shown in FIG. 1 suggests the use of two record wide leaves; however, single record wide leaves may be used, and, also, with the wall mount or the floor mount the two record wide leaves may be used. However, in the latter two cases, it is preferable to use the single record width so as not to be so bulky, and with the floor model to provide stability.

While the invention has been illustrated by reference to a particular device, there is no intent to limit the spirt or scope of the invention to precise details so set forth except as defined in the following claims.

I claim:

1. A phonograph record or album holder comprising an upright frame member; means for supporting said upright frame member in upright position; at least one record holding leaf pivotally mounted on said upright frame member; each said leaf including upper horizontal, lower horizontal and side frame members forming a peripherally closed rectangular frame and at least one intermediate horizontal rail spacedly mounted in said frame; said upper and lower members having at least one groove therein facing each other and inwardly of the edge of said frame, said at least one horizontal rail being spacedly mounted from said lower and upper frame member and each horizontal rail spaced from other horizontal rails a distance apart which is slightly less than the diameter of a phonograph record therebetween; each said horizontal rail having at least one lower groove facing a groove in the next lower adjacent horizontal member forming a set of grooves accommodating a phonograph record therein and an upper groove facing the lower groove in the next upper adjacent horizontal member forming a set of grooves accommodating a phonograph record therein; and deformable and resilient means mounted in each upwardly facing groove and being sufficiently deformable to depress by a record pressed thereagainst so as to permit a record to enter the upper groove and to expand to normal shape to retain a record between said lower and said upper grooves.

2. A phonograph record and album holder according to claim 1 in which a plurality of record holding leaves are mounted on said upright frame member.

3. A phonograph record and album holder according to claim 1 in which each leaf includes a plurality of horizontal rails intermediate said upper and lower frame members.

4. A phonograph record and album holder according to claim 1 in which each said horizontal rail and said upper and lower frame members include a pair of side by side grooves for holding two records back to back.

5. A phonograph record and album holder according to claim 1 in which said means for supporting the upright frame member includes floor to ceiling means for a friction mount therebetween.

6. A phonograph record and album holder according to claim 1 in which said means for supporting the upright frame member includes a vertical wall mounting and normal extensions to said upright frame connected therewith.

7. A phonograph record and album holder according to claim 1 in which said deformable and resilient means is a foamed plastic strip mounted in each upwardly facing groove.

References Cited

UNITED STATES PATENTS

| | | | |
|---|---|---|---|
| 709,819 | 9/1902 | Hicks | 211—76 |
| 887,882 | 5/1908 | Waugh | 211—169 |
| 1,799,809 | 4/1931 | Craft | 274—2 |
| 2,578,134 | 12/1951 | Headrick | 206—.84 |
| 3,080,963 | 3/1963 | Rothgart | 206—.84 |
| 3,092,256 | 6/1963 | Vernik | 211—40 |
| 3,181,706 | 5/1965 | Mandel | 211—163 |

ROY D. FRAZIER, *Primary Examiner.*

CHANCELLOR E. HARRIS, *Examiner.*

W. D. LOULAN, *Assistant Examiner.*